June 28, 1955 — E. L. McCARTHY — 2,711,814
APPARATUS FOR CLEANING FLAT BOTTOM GRAIN TANKS
Filed Aug. 14, 1953 — 2 Sheets-Sheet 1
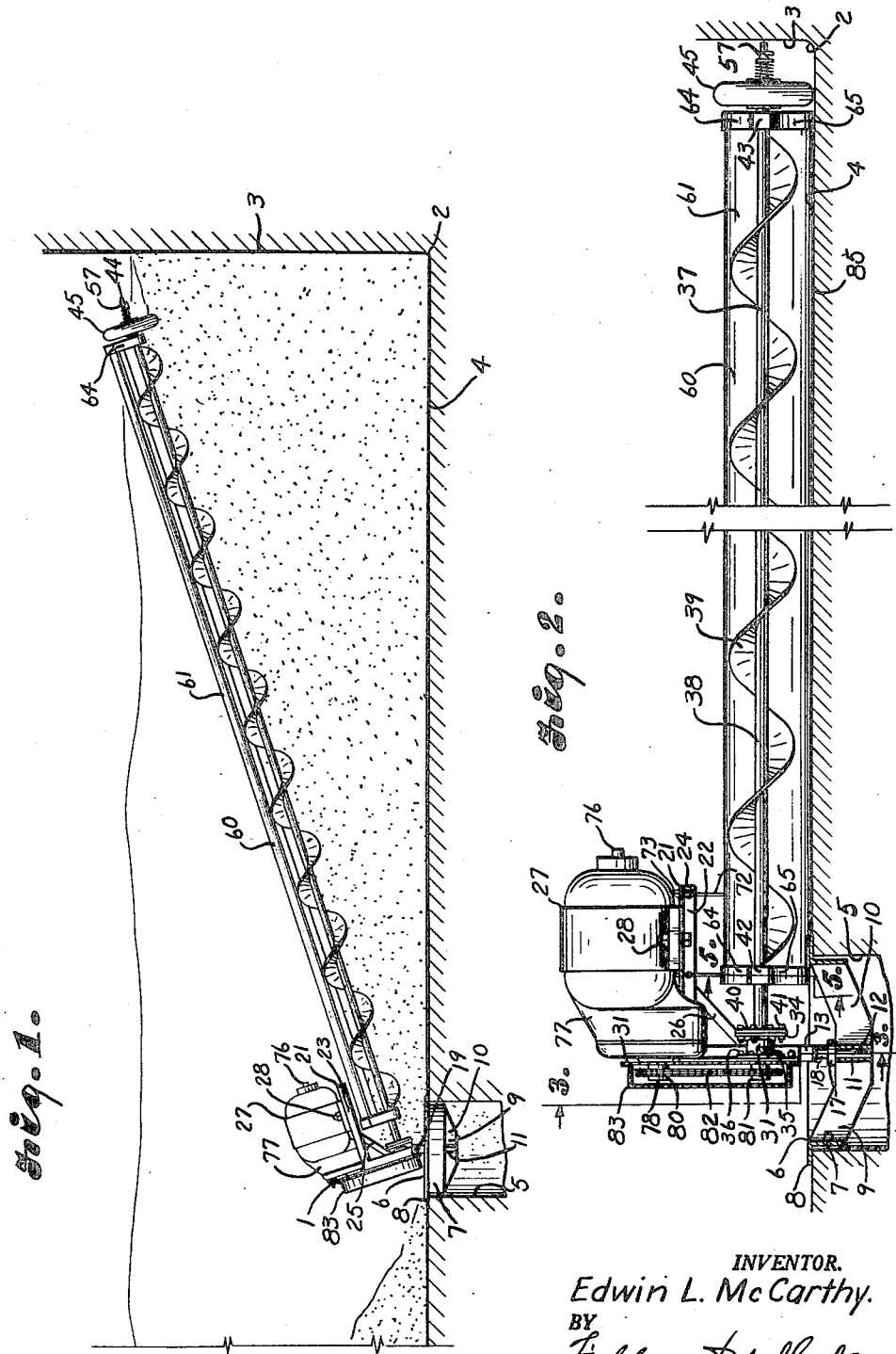
INVENTOR.
Edwin L. McCarthy.
BY
Fishburn & Mullendore
ATTORNEYS.

June 28, 1955     E. L. McCARTHY     2,711,814
APPARATUS FOR CLEANING FLAT BOTTOM GRAIN TANKS
Filed Aug. 14, 1953     2 Sheets-Sheet 2
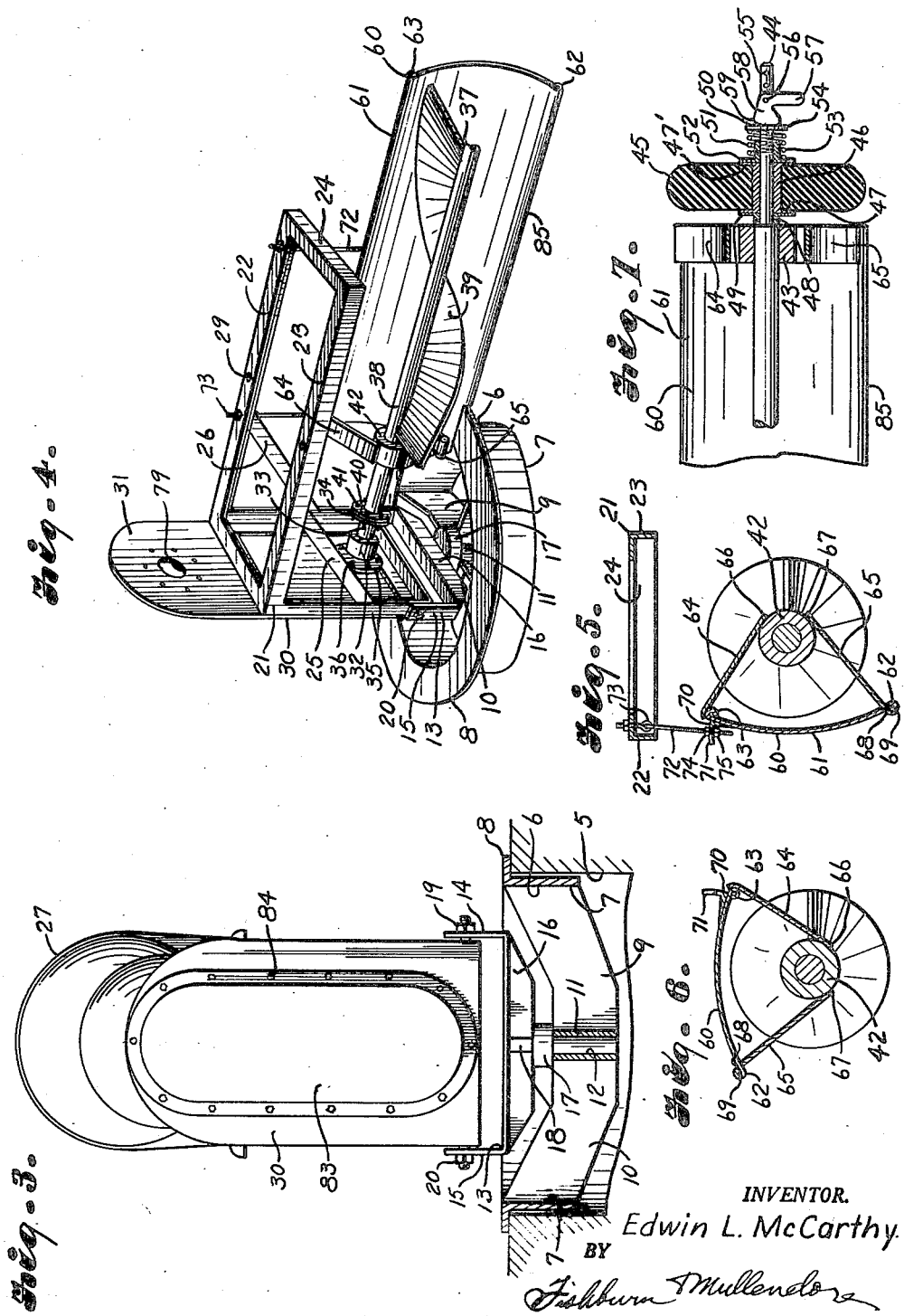
INVENTOR.
Edwin L. McCarthy
BY
Fishburn & Mullendore
ATTORNEYS.

United States Patent Office 2,711,814
Patented June 28, 1955

2,711,814

APPARATUS FOR CLEANING FLAT BOTTOM GRAIN TANKS

Edwin L. McCarthy, Kansas City, Mo., assignor to Bartlett and Company Grain, Kansas City, Mo., a corporation of Missouri Application August 14, 1953, Serial No. 374,205

3 Claims. (Cl. 198—64)

This invention relates to apparatus for cleaning flat bottom grain tanks, and more particularly to an auger rotatable in the bottom of the tank to remove the grain from the tank through an opening in the bottom thereof.

It is the present practice to store grain or other materials in flat bottom storage tanks or bins having openings in the bottom thereof for removal of the grain therefrom to an elevator, but in such practice there is always a large amount of grain or other material left in the flat bottom of the bin or tank because it cannot be moved by gravity through the openings in the bottom.

It is the principal object of the present invention to provide apparatus to remove the remaining grain or other material from the bottom of storage tanks or bins through the opening in the bottom thereof.

Other objects of the present invention are to provide a support in the opening in the floor of the bin having a bracket for pivotally mounting an auger thereon; to provide a motor and gear reduction means for rotating the auger and its shaft; to provide a wheel support on the outer end of the auger shaft which supports the outer end of the auger when the floor of the tank is contacted; to provide clutch means on the wheel for rotating the same when it is desired; to provide a mounting for the auger and its shaft whereby the said auger may be tilted upwardly to contact the top of the grain in the bin; to provide a bracket mounting for the motor; to provide a trough or baffle for the auger; to provide means for movement of the trough or baffle with respect to said auger whereby the auger may dig vertically into the grain or at an angle from its starting position; to provide means for holding the baffle in the desired position; and to provide a device of this character simple and efficient in operation.

In accomplishing these and other objects of the invention, I have provided improved details of structure, the preferred form of which is illustrated in the accompanying drawings wherein:

Fig. 1 is a side elevational view of my apparatus shown mounted in the bin and on top of the grain to be removed therefrom.

Fig. 2 is an enlarged view partly in cross section showing the auger in horizontal position on the bottom of the tank with the baffle contacting the bottom of the bin.

Fig. 3 is an enlarged cross-sectional view taken on a line 3—3, Fig. 2.

Fig. 4 is an enlarged fragmentary perspective view of the supporting member bracket and mounting of the auger thereon.

Fig. 5 is an enlarged cross-sectional view taken on a line 5—5, Fig. 2, particularly illustrating the device for controlling the position of the trough or baffle.

Fig. 6 is a cross sectional view particularly illustrating the trough or baffle in position for the auger to dig vertically through the grain.

Fig. 7 is a cross-sectional view particularly illustrating the wheel and clutch arrangement on the outer end of the auger.

Referring more in detail to the drawings:

1 designates cleaning apparatus imparting the features of my invention adapted to be used in a bin or tank 2. These bins are usually of circular construction and while my apparatus is particularly adapted for cleaning of grain from such structures it is also adaptable for use in square or rectangular bins or tanks wherein a plurality of openings are used in the bottom thereof.

The bin has side walls 3 and a bottom 4 having an opening 5 therein. 6 designates a support comprising a ring 7 adapted to engage in the opening 5 of the bottom of the tank. The ring has an outwardly extending annular flange 8 which engages on the floor 4 around the opening. The support or ring member includes a spider 9 comprising a plurality of ribs 10 having a central tube or sleeve 11 forming a bearing for a pin or king bolt 12 of a bracket 13 having upwardly extending arms 14 and 15. The bracket is angular-shaped having a depending flange as indicated at 16 and the pin 12 has a collar or head 17 to which the flange 16 is rigidly secured. A rib 18 is provided on the flange and collar 17 to lend rigidity to the structure.

Pivotally mounted to the upstanding arms 14 and 15 by bolts 19 and 20 is a frame 21 having outwardly extending arms 22 and 23 connected at their outer ends by a cross member 24. Braces 25 and 26 are provided for the frame and outwardly extending arms 22 and 23, and a motor 27 is mounted on the arms by bolts or the like 28 extending through openings 29 in said arms. The frame includes a back 30 which extends above the framework as indicated at 31. Mounted on the back 30 of the frame structure near the bottom thereof is an enclosed bearing 32 for a short shaft 33 provided on its outer end with a flange 34. The bearing 32 includes a flange 35 for securing the bearing to the back 30 of the frame. The flange 35 may be secured to the back member by bolts 36 or other suitable means.

37 designates a screw conveyor having a shaft 38 which extends outwardly from the framework structure upon which is mounted spirals 39 for conveying the material to the opening 5 in the bottom of the tank. Mounted on the inner end of the shaft 37 is a flange 40 adapted to be secured to a flange 34 secured to the outer end of the short shaft 33 by bolts or the like 41 to form a coupling between the shaft 37 and short shaft 32.

Mounted on the shaft 37 and spaced from the coupling a short distance is a bearing 42 and mounted on the outer end of the shaft spaced from the end thereof is a bearing 43. The shaft 37 extends outwardly from the screw conveyor as indicated at 44 and mounted thereon is a wheel 45 made of rubber or other suitable material for supporting the outer end of the conveyor and rotating with the conveyor shaft when the conveyor is in the horizontal position as shown in Fig. 2. The wheel 45 has a sleeve or bearing 46 with friction flanges 47 and 47' engaging the sides of the wheel. The wheel is spaced from the conveyor by keyed hub 48 having a flange 49 engaging the flange 47 of the wheel. A clutch member 50 is provided on the outer end of the shaft 37 and comprises a keyed hub 51 having a flange 52 engaging the flange 47' of the wheel. A coil spring 53 is adapted to engage over the shaft and the keyed hub 51 having one end bearing against a washer 54 and its other end against the flange 52 of the hub 51. The outer end of the shaft is provided with a plurality of openings 55 adapted to receive a pin or bolt 56 for securing thereto a lever 57 having a head 58 providing a cam surface 59 for engaging against the outside of the washer 54 for exerting pressure on the spring to cause rotation of the wheel. Disengagement of the cam head from the washer by movement of the lever will disengage the clutch from the wheel (Fig. 1).

60 designates a baffle or trough member which extends the full length of the spiral conveyor and comprises a sheet of material 61 such as metal or the like having its outer edges rolled as indicated at 62 and 63 (Figs. 5 and 6). Secured to the respective outer ends of the baffle by welding or other suitable means are arms 64 and 65 having their outer free ends welded or otherwise suitably secured to the bearings 42 and 43 respectively as illustrated at 66 and 67 (Figs. 5 and 6). The lower edge of the baffle is provided with an opening as indicated at 68 and the arms 65 are extended therethrough and welded as indicated at 69.

Secured to the back of the baffle near the upper edge thereof by welding or other suitable means are spaced brackets 70 having slots 71 adapted to receive the shanks of I-bolts 72 connected to spaced I-bolts 73 carried by the arm 22 of the framework structure for adjustably mounting the baffle thereto. The threaded I-bolts 72 are provided with spaced nuts 74 and 75 for adjustment on the threads of the rod to adjust the height of the baffle with respect to the auger of the conveyor.

The motor 27 includes a shaft 76 and a housing 77 for the usual gear reduction mechanism (not shown). The gear reduction mechanism includes a shaft 78 which extends through an opening 79 in the back 31 and mounted on the shaft is a sprocket 80 leading to a sprocket 81 mounted on the short shaft 32 which extends through an opening in the lower portion of the back 25. A chain 82 runs over the sprockets 80 and 81 for driving the screw conveyor through the motor 27. A housing or plate 83 is provided for covering the chain and sprocket mechanism and is secured to the back by stud bolts or the like 84, thus forming a housing for the chain and sprocket which is adapted to contain a lubricant as is the usual practice.

Operation of apparatus constructed and assembled as described is as follows:

The storage bins or tanks usually contain an opening in the sidewalls thereof (not shown) and the mechanism of the present apparatus may be inserted therethrough, and the supporting member comprising the ring 7 and the bracket arrangement secured in the opening 5 in the bottom of the tank. The bracket and frame for the motor mounting are readily attachable to the support through the bolts 19 and 20 and the screw conveyor may be attached to the coupling provided by the flanges 34 and 40. The hangers for the baffle are also detachable and may be assembled inside of the storage tank if desired.

With the device assembled as shown in Fig. 1 the screw conveyor will engage the top of the grain or other material in the tank and with the baffle in raised position as shown in Figs. 1 and 6, the auger will dig downwardly in a substantial straight line to the bottom of the tank and continued operation of the motor will remove the grain through the opening 5. When the conveyor is in the position shown in Fig. 1, it is not necessary to have the wheel 44 rotating but it may be desirable when the auger reaches the bottom of the tank. When the auger reaches the bottom of the tank, the baffle may be lowered to the position shown in Figs. 2 and 5 and the baffle acts to prevent the grain from being thrown back from the auger, the spirals of the auger carrying the grain to the opening along the baffle. At this point the clutch may be manipulated so the wheel will engage the bottom of the tank and as the grain is removed the wheel will cause the auger mechanism to feed into the grain as it moves around the tank in a circular manner so that it will eventually move all of the grain or other material through the opening 5. When the baffle 60 is in the position shown in Fig. 2, the lower edge 85 will contact the bottom of the tank and scoop up the grain so that the spiral may convey it to the opening in the tank.

It will be obvious from the foregoing that I have provided an improved apparatus for removing material from storage tanks or the like, which may be quickly assembled and operated to clean the tank at a minimum cost. It will also be noted that the baffle has two positions, one over the auger to cause the auger to move downwardly through the material to the bottom of the bin and the other to the side of the auger when the auger is moved over the floor of the bin. It is also obvious that when the apparatus is inserted in a bin, it is merely placed upon the bulk material and caused to move downwardly when the baffle is moved to the first position. It is also obvious that the construction of the auger frame, which includes the upright and lateral portions, provides a compact construction which with the coupling 34 permits transportation and assembly of the apparatus in sections, one of which may be the support 6, another the auger frame including the motor and speed reducing unit and another the auger and baffle that is associated therewith.

What I claim and desire to secure by Letters Patent is:

1. An apparatus for removing bulk material through the bottom outlet opening of a storage bin after the material has reached an angle of repose between the bottom and side walls of the bin, said apparatus including a support for engagement within the outlet opening of the bin and having a bearing in substantial alignment with the center of said opening, a bracket having pivotal support by said bearing and having upwardly extending spaced apart arms, an auger supporting frame having an upright portion and a laterally extending portion, means pivotally connecting the upright portion of said supporting frame to said arms of the bracket, an auger having one end rotatably carried by said upright portion of the supporting frame below said laterally extending portion, a motor and speed reduction unit carried upon said laterally extending portion of the supporting frame and having a driving connection with said end of the auger to effect rotation thereof, mobile means for supporting the other end of the auger, a baffle substantially coextensive with the auger, means supporting the baffle coaxially from ends of the auger to swing from a position over the auger when the auger and supporting frame pivot on said arms of the bracket to render the auger effective in moving downwardly through the bulk material and moving the material along the under side of the baffle to said outlet and to swing to a position at the side of the auger when the auger supporting frame and auger are moved on said bearing support for clearing the material from the bottom of the bin and moving the material along said baffle to the outlet opening, and removable means connecting the baffle with said laterally extending portion of the supporting frame to support the baffle in said last named position.

2. An apparatus for removing bulk material as described in claim 1 wherein said mobile means for supporting said other end of the auger comprises a wheel having rotating support on the auger shaft, and a clutch for connecting the wheel with the shaft for driving the wheel to effect movement of the auger on said bearing support when clearing the bottom of the storage bin.

3. An apparatus for removing bulk material through the bottom outlet of a storage bin, wherein the support of the end of the auger by said upright portion of the auger supporting frame includes a drive shaft, a coupling removably connecting the drive shaft with the auger, and means connecting said drive shaft with the speed reduction unit to complete the driving connection between said unit and the auger.

References Cited in the file of this patent

UNITED STATES PATENTS

| | | |
|---|---|---|
| 1,482,524 | Robinson | Feb. 5, 1924 |
| 1,735,920 | Fitzhugh | Nov. 19, 1929 |
| 2,058,125 | Bean | Oct. 20, 1936 |
| 2,528,679 | Ballard et al. | Nov. 7, 1950 |